No. 623,303. Patented Apr. 18, 1899.
I. BRECHNER.
CORN PLANTER.
(Application filed Aug. 2, 1898.)
(No Model.) 2 Sheets—Sheet 1.

Witnesses
Jos. H. Blackwood
Hartwell P. Heath

Inventor
Israel Brechner
by A. A. Gourick
Attorney

No. 623,303. Patented Apr. 18, 1899.
I. BRECHNER.
CORN PLANTER.
(Application filed Aug. 2, 1898.)
(No Model.) 2 Sheets—Sheet 2.
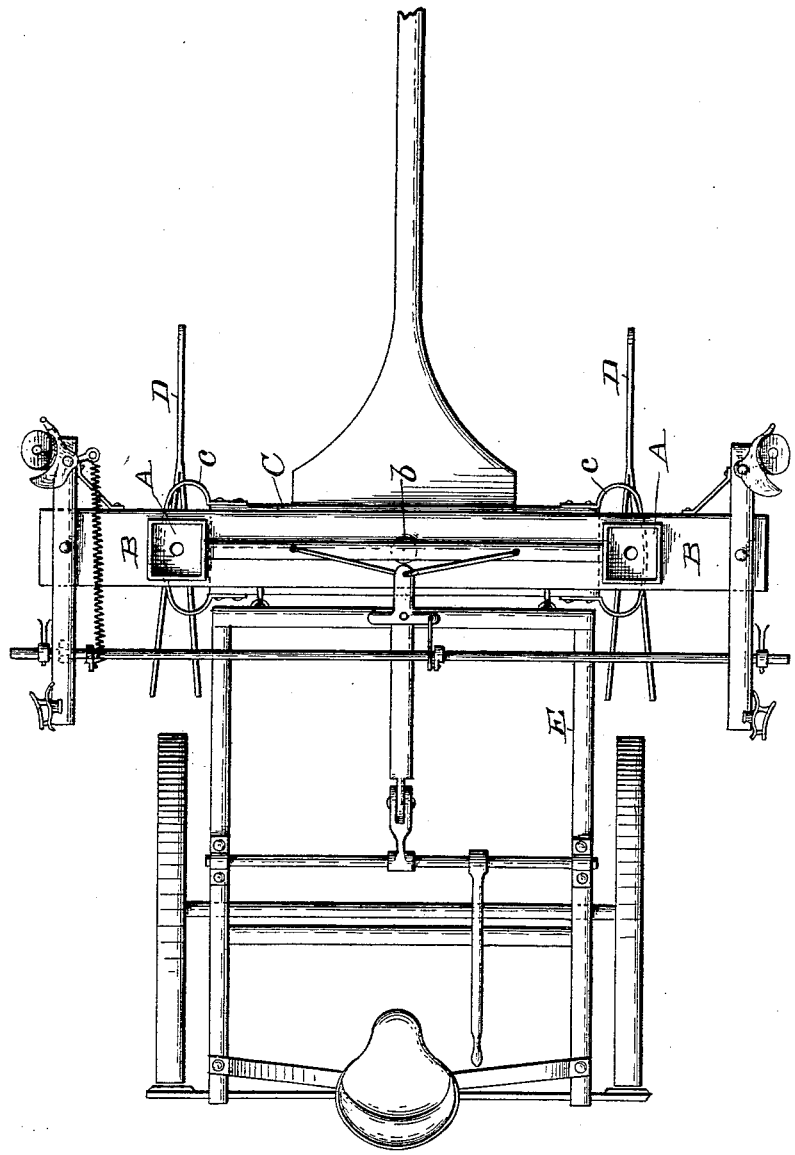
Witnesses
Jas. H. Blackwood
Hartwell P. Heath
Inventor
Israel Brechner
by D. A. Gowrick
Attorney

UNITED STATES PATENT OFFICE.

ISRAEL BRECHNER, OF WATERLOO, IOWA.

CORN-PLANTER.

SPECIFICATION forming part of Letters Patent No. 623,303, dated April 18, 1899.

Application filed August 2, 1898. Serial No. 687,558. (No model.)

*To all whom it may concern:*

Be it known that I, ISRAEL BRECHNER, a citizen of the United States, residing at Waterloo, in the county of Black Hawk and State of Iowa, have invented a certain new and useful Improvement in Corn-Planters, of which the following is a specification.

My invention relates to corn-planters on wheels provided with shoes to open the drills, seed hoppers and spouts to feed the corn into the drills, and covering-wheels, and has for its object to feed always in a straight line with the covering-wheels, regardless of the swaying from side to side of the team drawing the planter. This object I accomplish in the manner and by the means hereinafter fully described in detail and particularly pointed out in the claims, reference being had to the accompanying drawings, in which like reference-letters indicate like parts in all the figures.

Figure 1:
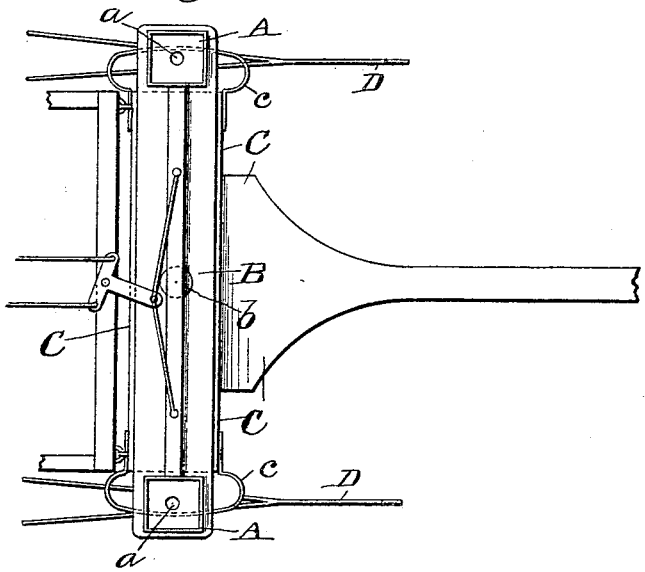
Figure 2:
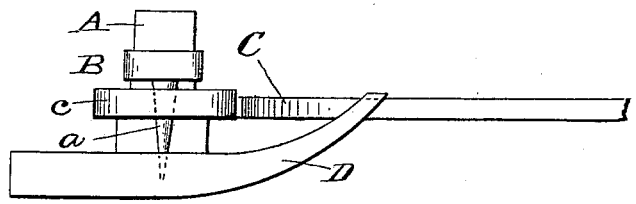
Figure 3:
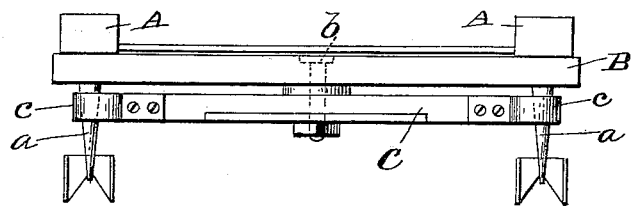

Figure 1 is a top plan view of my invention. Fig. 2 is a side elevation of same. Fig. 3 is a rear elevation of same. Fig. 4 is a top plan of the entire machine.

Any of the ordinary forms of wheeled corn-planters may be used with my invention, which consists in placing the seed-hoppers A on the opposite ends of a bolster B, pivotally mounted by a king-bolt b through its center, with proper washers and nuts on the frame C, carrying the shoes D, which are bifurcated toward the rear. On the ends of the frame C clevises c are rigidly secured horizontally, and through the clevises c the feed-spouts a extend down from the seed-hoppers A into the bifurcation at the rear of the shoes D. The frame carrying the covering-wheels and provided with any of the usual means of regulating the supply of seed may be secured rigidly or so as to allow of vertical play to said bolster B, the covering-wheels being immediately in rear of the feed-spouts a.

The operation of my invention is as follows: As the team drawing the planter sways, the king-bolt b allows the frame C, carrying the shoes D, to turn in either direction until the feed-spouts a come in contact with the clevises c. The bolster B, carrying the feed-hoppers A, being secured to the frame E, carrying the covering-wheels, the feed-spouts a oscillate in the bifurcation at the rear of the shoes D, but always maintain their position immediately in front of the covering-wheels.

Having thus described my invention, what I claim as new, and desire to secure by Letters Patent, is—

1. In a corn-planter having shoes bifurcated toward the rear, seed-hoppers provided with spouts which oscillate in said bifurcation and are adapted to feed always in line with the covering-wheels, substantially as shown and described.

2. In corn-planters provided with shoes bifurcated toward the rear and having the shoe-carrying frame and the frame carrying the covering-wheels connected by a king-bolt, seed-hoppers adapted to feed the seed into said bifurcation and secured in front of the covering-wheels and means for regulating the lateral motion of the shoes, substantially as shown and described.

3. In a corn-planter, a bolster secured by a king-bolt to the frame carrying the shoes, said shoes being bifurcated toward the rear, the frame carrying the covering-wheels being attached to said bolster, a seed-hopper placed at each end of said bolster, a clevis rigidly secured horizontally at each end of said shoe-carrying frame and feed-spouts leading from said seed-hoppers through said clevises into the bifurcation at the rear of said shoes, substantially as shown and described.

In testimony whereof I hereto affix my signature in the presence of two witnesses.

ISRAEL BRECHNER.

Witnesses:
F. L. PARMELEE,
J. L. SCOFIELD.